United States Patent [19]

Carter

[11] 4,078,833
[45] Mar. 14, 1978

[54] TESTABLE PIPE SADDLE

[75] Inventor: William R. Carter, Dover, Mass.

[73] Assignee: Hershey Products Inc., Dedham, Mass.

[21] Appl. No.: 728,316

[22] Filed: Sep. 30, 1976

[51] Int. Cl.² .............................................. F16L 35/00
[52] U.S. Cl. ...................................... 285/24; 285/93; 285/199; 73/46
[58] Field of Search ................. 285/197, 198, 199, 93, 285/24, 27; 138/90; 73/46

[56] References Cited

U.S. PATENT DOCUMENTS

| 2,050,985 | 8/1936 | Trickey | 285/199 X |
|---|---|---|---|
| 2,239,651 | 4/1941 | McMurray et al. | 285/197 |
| 2,973,976 | 3/1961 | Steinen | 285/197 |
| 3,331,622 | 7/1967 | Bagnulo | 285/198 |
| 3,558,162 | 1/1971 | Ferrai et al. | 285/93 |

*Primary Examiner*—Dave W. Arola

[57] ABSTRACT

Use of a separate alignment ring to position a saddle relative to a main pipe makes possible first testing the saddle-main pipe seal, and then making a shift-free connection with the pretested seal.

2 Claims, 2 Drawing Figures

TESTABLE PIPE SADDLE

This invention relates to saddle pipe connections and to a method of making the same; it relates in particular to such connections which can both be tested for tightness and secured against relative shifts in position.

BACKGROUND OF THE INVENTION

Saddle branch connectors are widely used in the art, particularly in connection with old main sewer pipes. The latter are in varied conditions of age and character, and achieving good seals with branch connectors is not an inevitable thing. In consequence, it is desirable to test new joints by putting them under pressure, and this has been done in the art.

It is also desirable to provide means resisting a shift in relative position between the two lines in a connection, and prior art devices have provided for this with tabs extending from the side connection and engaging the hold in the main pipe. However, in this prior art it was necessary to drill the hole to accommodate the tabs, and hence testing was no longer possible.

SUMMARY OF THE INVENTION

The invention features a saddle assembly which may be attached and sealed and tested prior to making a hole in the main pipe, following which the hole may be drilled through a saddle hole and an alignment ring dropped in to hold the saddle in position relative to the main pipe, the latter alignment ring then being held in place by the branch pipe's being placed in position, and the method of making it.

In preferred embodiments a pressure collar is used and angular positioning means locate the alignment ring circumferentially relative to the saddle.

The invention permits, for the first time, testing a seal as well as guarding against a relative shift in position.

PREFERRED EMBODIMENT

We turn now to drawings and description of a presently preferred embodiment of the invention.

DRAWINGS

Figure 1:
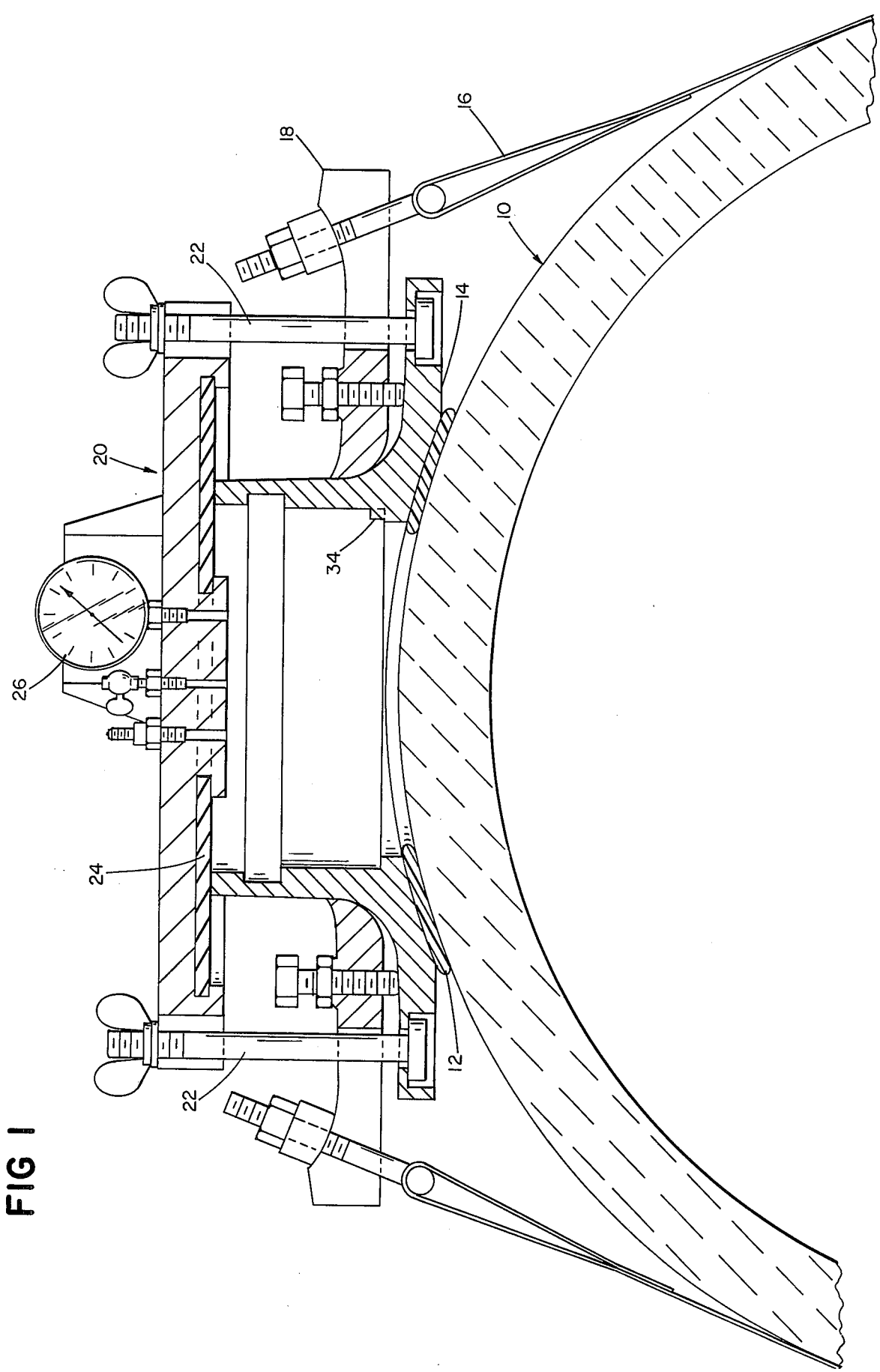
Figure 2:
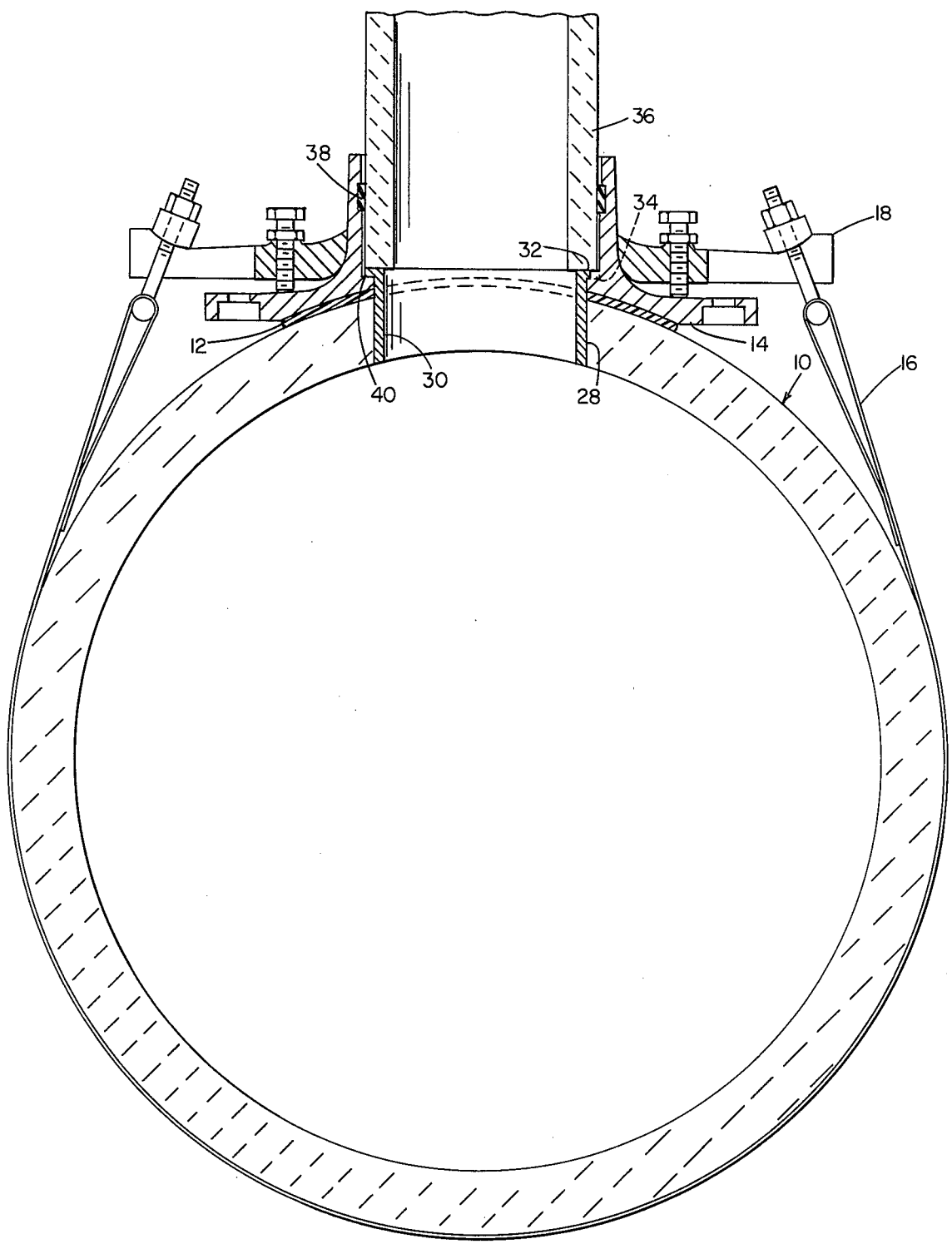

FIG. 1 is a sectional view, partially broken away, showing test of the seal prior to drilling the branch pipe hole; and FIG. 2 is a sectional view showing the completed connection.

DESCRIPTION

Main pipe 10 has assembled to it, with mastic seal 12, saddle 14. Strap 16 acts through collar block 18 (wider than saddle 14 for improved mechanical advantage) to hold saddle 14 in position. The test assembly indicated generally at 20 can then be attached to the saddle by means of bolts 22, gasket 24 (wide to accommodate varying pipe sizes) engaging saddle 14 for an upper seal. Suitable pressure for testing (e.g., 5-10 psig) can then be applied and observed on gauge 26.

If the seal is good, the test rig is removed and the hole 28 drilled in the main pipe. Alignment ring 30 is then dropped in; its inner edge conforms in shape with that of the main pipe, and so is not planar; a notch 32 on the ring engages boss 34 in the saddle for proper circumferential locating.

Branch pipe 36 is then assembled, sealingly through gasket 38, and at its end holds alignment ring 30 in position against shoulder 40 of saddle 14.

The result is a pre-tested shift-resistant connection.

Other embodiments within the scope of the claims will occur to those skilled in the art; what is claimed is:

1. A saddle connection comprising a saddle with a hole centrally therethrough, means for holding and sealing said saddle to a main pipe, and an alignment ring extending through said hole in close relation thereto, said alignment ring including a portion extending inwardly of said saddle and fitting closely in the hole through said main pipe to maintain said main pipe and said saddle in constant relative relationship, said ring having an outer surface engageable by a branch pipe to hold said ring in position, and an inner surface on said ring conforming to the inner surface of said main pipe, said alignment ring and said saddle including cooperating circumferential and radial locating means, said circumferential and radial locating means insuring that said inner surface conforms to said the inner surface of main pipe, whereby a seal between said saddle and said main pipe may be tested prior to drilling a hole for said alignment ring and said main pipe is free of obstructive intrusion into its inside diameter.

2. The combination of claim 1 in which said means includes a pressure collar, said pressure collar being of greater width, in the main pipe diameter direction, than said saddle.

* * * * *